United States Patent
Chou et al.

(10) Patent No.: US 9,827,160 B2
(45) Date of Patent: Nov. 28, 2017

(54) SAFETY KEY THAT IDENTIFIES IMPROPER INSERTION

(71) Applicants: Cheng I Chou, City of Industry, CA (US); Jackson Bishop Hsieh, City of Industry, CA (US)

(72) Inventors: Cheng I Chou, City of Industry, CA (US); Jackson Bishop Hsieh, City of Industry, CA (US)

( * ) Notice: Subject to any disclaimer, the term of this patent is extended or adjusted under 35 U.S.C. 154(b) by 241 days.

(21) Appl. No.: 14/554,375

(22) Filed: Nov. 26, 2014

(65) Prior Publication Data

US 2016/0143799 A1    May 26, 2016

(51) Int. Cl.
*A61H 1/02*     (2006.01)
*F16B 1/00*     (2006.01)
*F16B 19/02*    (2006.01)

(52) U.S. Cl.
CPC ... *A61H 1/0218* (2013.01); *A61H 2201/0173* (2013.01); *A61H 2201/1642* (2013.01); *A61H 2203/0493* (2013.01); *F16B 1/0071* (2013.01); *F16B 19/02* (2013.01)

(58) Field of Classification Search
CPC ...... F16B 1/0071; F16B 19/02; Y10T 403/20; Y10T 403/32508; Y10T 403/32951; Y10T 403/553; Y10T 403/598; Y10T 403/7079; Y10T 403/7088; Y10T 403/75; A61H 1/0218; A61H 2201/1642; A61H 2203/0493; A61H 2201/0173
See application file for complete search history.

(56) References Cited

U.S. PATENT DOCUMENTS

| | | | |
|---|---|---|---|
| 4,534,555 A | 8/1985 | McGowen | |
| 5,556,362 A | 9/1996 | Whipps | |
| 6,299,223 B1 * | 10/2001 | Ji | E05C 5/02 292/175 |
| 6,786,669 B2 | 9/2004 | Tsui | |
| 6,869,243 B1 | 3/2005 | Teeter | |
| 7,399,260 B1 | 7/2008 | Chen | |
| 7,507,192 B2 | 3/2009 | Teetwe | |
| 7,837,605 B2 | 11/2010 | Wu | |
| 8,454,260 B2 | 6/2013 | Wilcoxson | |

* cited by examiner

*Primary Examiner* — Matthieu F Setliff
(74) *Attorney, Agent, or Firm* — Kirk A. Buhler; Buhler & Associates

(57) ABSTRACT

A key with extending wings. The with at least one wing that open when the key is not properly installed and the at least one wing retract into the body of the key when the key has been properly inserted regardless of the viewing angle of the key. The key identifies improper insertion and include a spring-loaded pin and inner shaft that engages into aligned locating holes in an inversion bench. In addition to the visual appearance, a blind user can feel the sides to the key to determine if the key has been properly inserted into the inversion bench.

9 Claims, 4 Drawing Sheets

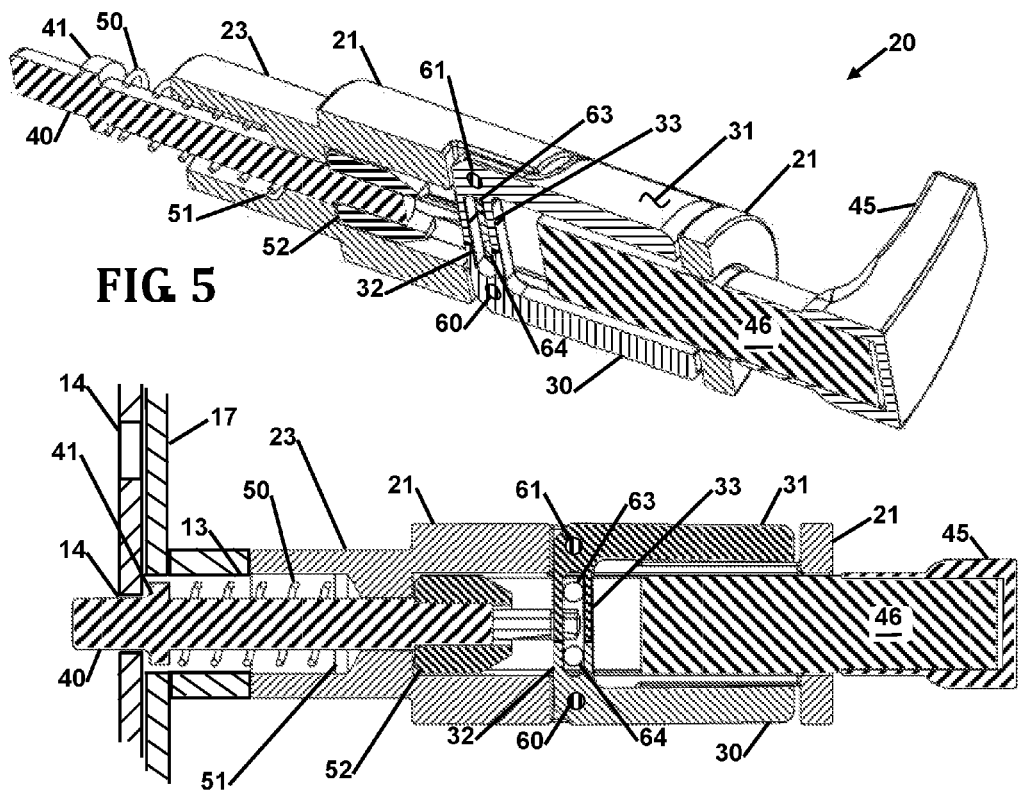
FIG. 5
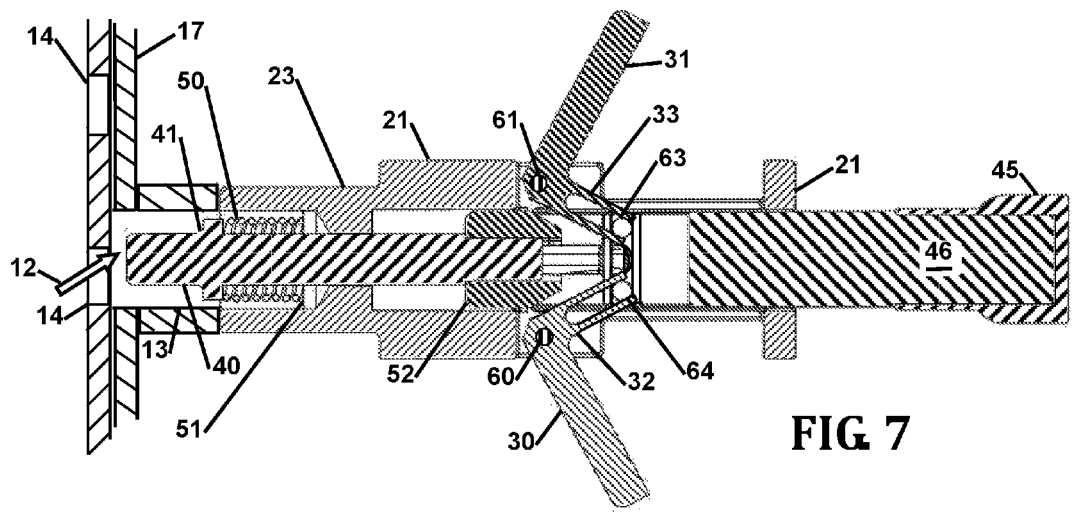
FIG. 6
FIG. 7

SAFETY KEY THAT IDENTIFIES IMPROPER INSERTION

CROSS REFERENCE TO RELATED APPLICATION

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in a locating pin. More particularly, the present Safety Key That Identifies Improper Insertion notifies that the pin is not properly inserted to prevent injury when the pin is not completely and properly inserted.

Description of Related Art Including Information Disclosed Under 37 CFR 1.97 and 1.98:

There are several different pieces of equipment that utilize a pole with one or multiple holes and use a pin that fits through one or more holes to retain a position of the pin in the pole. Equipment that uses this type of design is height lifting equipment, seat positioning and inversion equipment. Proper insertion of the pin is often difficult for inexperience people. Even for experienced users with poor vision, proper insertion that makes sure the pin completely and safely inserted is difficult to determine. The most common pin is an elongated shank with an enlarged end that is gripped by the user. Where the pin is not visible on both sides of the hole, proper insertion is difficult to determine. A number of patents and or publications have been made to address these issues. Exemplary examples of patents and or publication that try to address this/these problem(s) are identified and discussed below.

U.S. Pat. No. 5,556,362 issued on Sep. 17, 1996 to Allen M. Whipps discloses an Automatic Weight Stack pin Selector. The pin is a self-releasing pin for a weight training machine of the type having a vertical stack of weights. The self-releasing pin automatically releases a selected number of weights from engagement with a lifting bar when the selected number of weights is returned to a resting position. The pin does not have a visual indicator that the pin has been properly inserted.

U.S. Pat. No. 6,786,669 issued on Sep. 7, 2004 to Walter Tsui et al., discloses a Positive Lock Quick Release Pin. The positive lock quick release pin is for locking a plurality of objects together includes an internal shaft connected to an external shaft with a handle portion. The internal pin slides within the outer shaft that elevates to show that the pin is engages. While this provides a visual indicated, a person looking directly at the pin can't determine that the pin has been properly inserted.

U.S. Pat. No. 6,869,243 issued on Mar. 22, 2005 to Roger C. Teeter discloses a Cotter Having Indicator [A] Device used in an inversion bench. The cotter is used for locking or latching tubes or extensions together, and includes a shank having a lower end, a handle attached to top of the shank, a ferrule slidably attached onto the shank and arranged between the handle and the lower end of the shank and having a portion applied with an indicating layer. The indicator is visible from the side, but from the perspective of a user, correct insertion of the cotter is not visible.

U.S. Pat. No. 8,454,260 issued on Jun. 4, 2013 to Ken Wilcoxson discloses a Weight Selecting Pop-pin. The pop-pin has a spring loaded into an unstable equilibrium position can be inserted into a weight stack to select a weight and vertical guide bar. While this pin uses a spring, the pin does not provide an indicator that the pin has been properly installed.

What is needed is a single-sided insertion pin that provides a visual indicator from all sides of the insertion pin that the pin has been properly inserted. The safety key that identifies improper insertion described in this document provides the solution.

BRIEF SUMMARY OF THE INVENTION

It is an object of the safety key that identifies improper insertion for use with an inversion bench or other product that requires confirmation that a pin has been properly inserted into one or a plurality of concentric holes. The use of inversion benches allows a person to relieve pressure on a back and help align the spine. For many of the inversion benches, a user must temporarily lock their ankles into the bench prior to inversion. If the ankles are not properly locked into the bench, the user can slide or fall out of the bench and cause injury. Many users use the inversion bench without glasses or are older and have poor eyesight. The safety key must provide a clear visual indication that the key has been properly inserted regardless of the viewing angle of the user, or care giver before inversion of the bench begins.

It is another object of the safety key that identifies improper insertion to include a spring loaded pin and inner shaft that engages into locating hole in the inversions bench. When the pin is inserted into the bench, the pin must pass through several holes. The final hole enters the structural frame and secures the ankle clamp to the bench. While the pin may appear to be inserted into the bench, it is simple for a new, unskilled or unfamiliar user or care giver to insert the pin without knowing if the pin has been correctly inserted completely through all of the openings to ensure that the pin is extended into the structural member. The pin slides in and through central shaft.

It is still another object of the safety key that identifies improper insertion for the key to have wings that extend from the key. There are two wings that fold, extend or tip from the body of key. Because the wings extend outwardly from the key they are visible from all sides of the key. In addition to the visual appearance, a user who is completely blind can also feel the sides to the key to determine if the key has been properly inserted into the inversion bench.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

FIG. 5 shows a perspective cross-sectional view from FIG. 3 of the safety key with the wings retracted.

FIG. 6 shows a cross-sectional view of the safety key from FIG. 3 with the wings retracted.

FIG. 7 shows a cross-sectional view of the safety key from FIG. 4 with the wings extended.

DETAILED DESCRIPTION OF THE INVENTION

Figure 1:
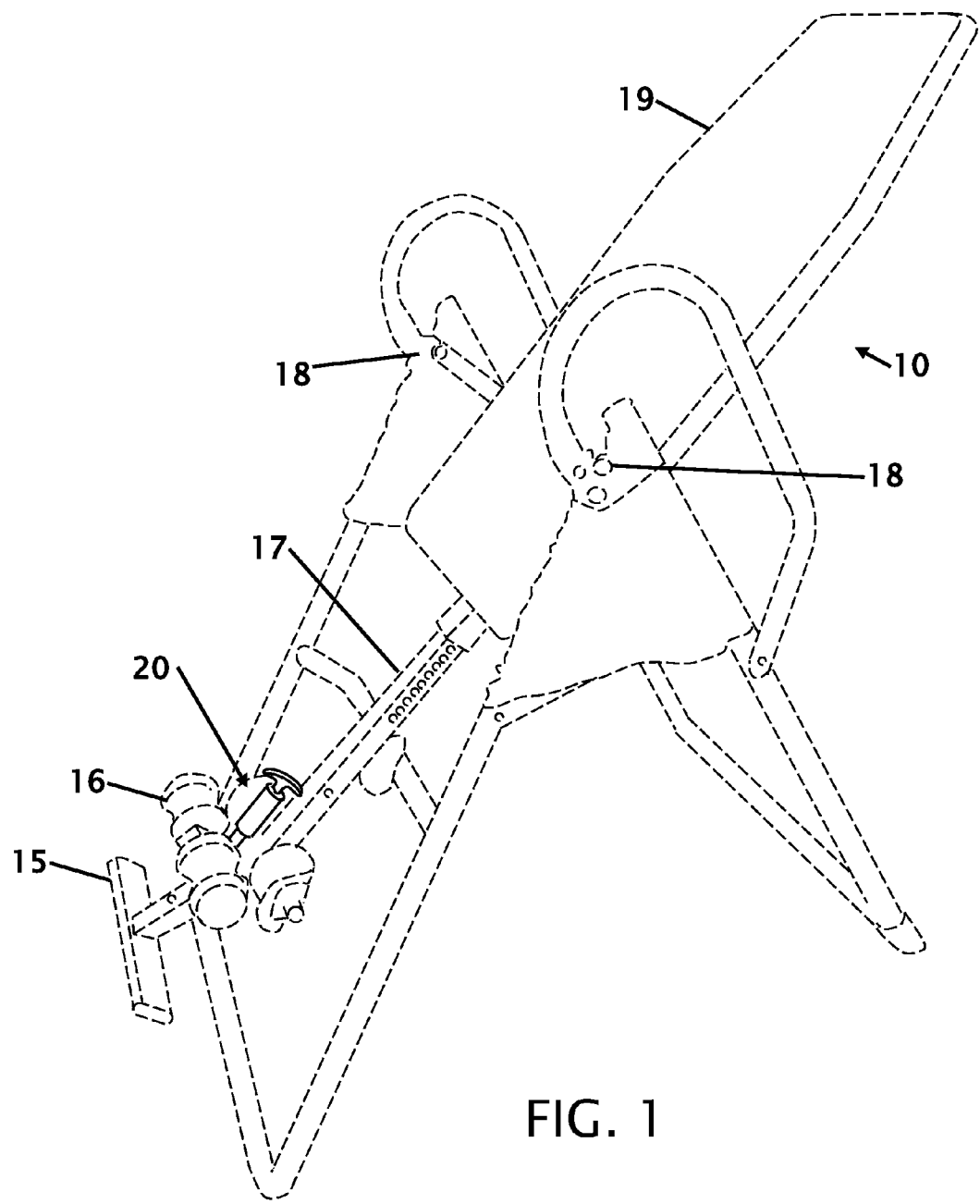
FIG. 1 shows an inversion bench with a properly inserted safety key.

FIG. 1 shows an inversion bench 10 with a properly inserted safety key 20. The inversion bench 10 allows a user to enter the inversion bench in an approximately vertical orientation. The user stands on the foot peg 15. The user steps into the inversion bench and places the back of their ankles in the bottom of the bench. The front of their ankles are held under front cushions 16. The safety key 20 locks the legs of the user in the inversion bench prior to inversion. If the ankles are not properly locked in the inversion bench, as the bench begins to invert a user can slide out the end of the bench 10. In this figure the safety key 20 is shown properly inserted.

When the person is properly secured in the inversion bench 10, the inversion bench pivots through axle 18 to allow the feet of a person to be elevated over the head of the user. The inversion bench has an elongated telescoping tube 17 that allows the person to adjust their center-of-gravity relative to the pivoting axis 18 of the inversion bench. If the key was not properly inserted into the safety key 20, the wings of the safety key 20 will extend out the sides of the key where the wings are visible from any top or side viewing angle as shown in FIG. 2.

Figure 2:
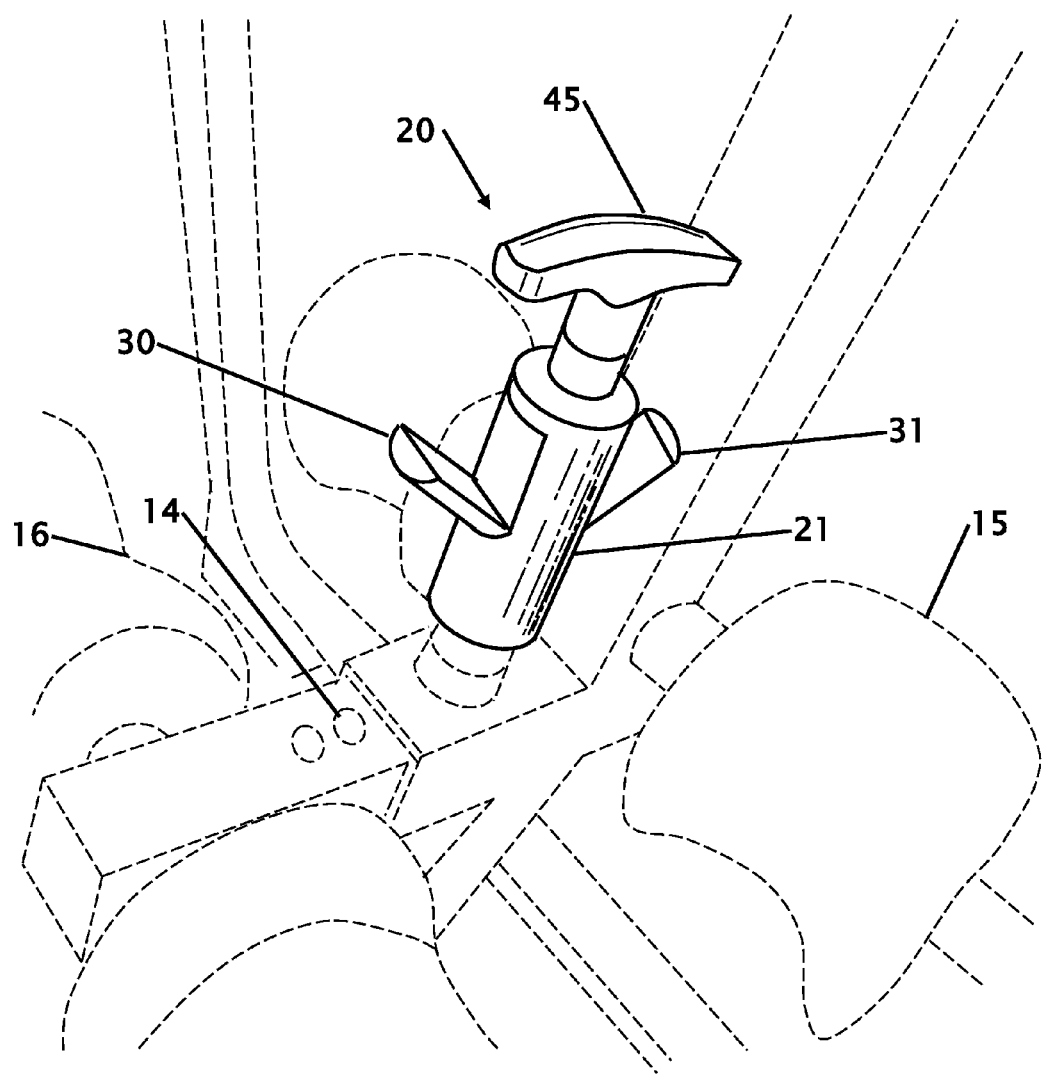
FIG. 2 shows an improperly inserted safety key in an inversion bench.

FIG. 2 shows an improperly inserted safety key 20 in an inversion bench 10. This view is focused in the area of the inversion bench 10 surrounding the safety key 20. The rear ankle pads 15 and the front ankle pads 16 are visible. The safety key 20 is placed through the horizontal tube into the holes 14 where the ankles of the person are sandwiched between front 16 and rear 15 ankle supports. The physical geometry of each person is different and the dimension between the front 16 and rear ankles 15 can be different. The multiple holes 14 allow for adjustment of the different physical size of each user to ensure that the ankles are securely retained to support a person in the inverted orientation of the inversion bench.

From this view the safety key 20 is shown improperly inserted. A user can easily determine that the key is improperly inserted because the wings 30 and 31 are shown extended from the body 21 of the safety key 20. To insert the safety key 20, a user or care giver pulls out the handle 45 and pushes the end of the safety key 20 into the ankle retainer of the inversion table. When the safety key 20 is properly inserted the wings 30 and 31 are retracted into the safety key 20 whereby a user can easily see that the safety key 20 is properly installed before the user begins inversion of the bench.

While these figures show and describe the safety key 20 being used with an inversion bench, it should be understood that the safety key 20 can be used in all other pieces of equipment that identifies when alignment of two or more holes is achieved. Other pieces of equipment include, but are not limited to strength machines, exercise equipment and benches with multiple angle adjustments.

Figure 3:
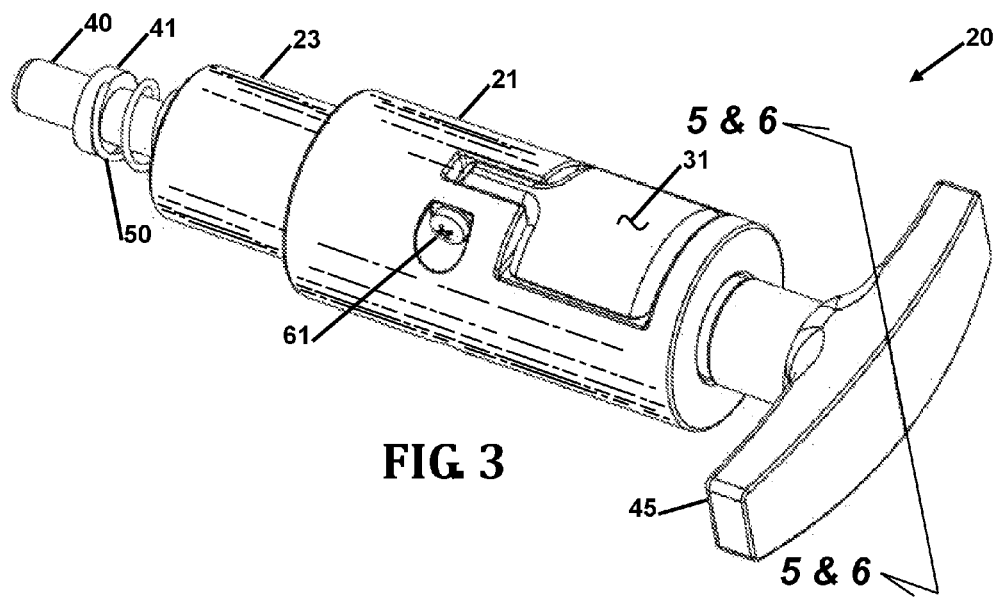
FIG. 3 shows a safety key as it would appear in a properly inserted condition.
Figure 4:
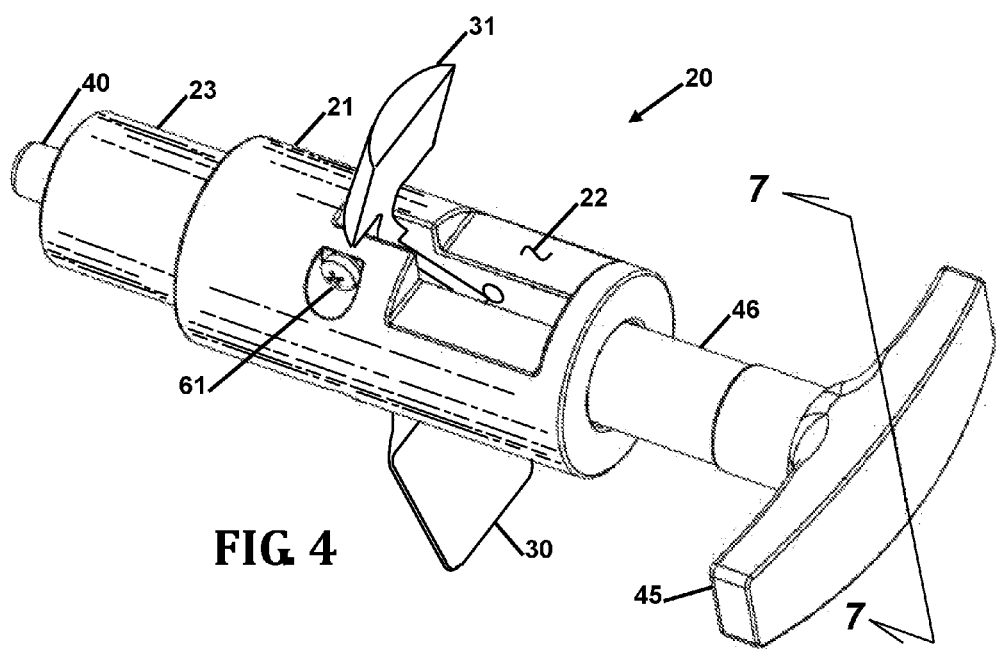
FIG. 4 shows a safety key as it would appear when improperly inserted.

FIG. 3 shows a safety key 20 as it would appear in a properly inserted condition and FIG. 4 shows a safety key 20 as it would appear when improperly inserted. The safety key 20 has a cylindrical body with a larger outer diameter 21 and a smaller diameter 23. A handle 45 connects to internal rod components that extend from the handle 45 through the cylindrical body to the tip 40. The tip 40 has a shoulder 41 that restrains a compression spring 50. The compression spring 50 pushes against an interior surface of the safety key 20 and against the shoulder of the enlarged portion 41 of the tip 40 to help maintain the internal shaft in the position shown in FIG. 3.

When the safety key 20 is properly inserted into the inversion bench the tip 40 is extended through the locating holes in the ankle retainer in the inversion bench. If the tip 40 of the safety key 20 does not extend into a hole in the inversions bench the tip 40 is pushed into the body 23 and 21 of the safety key 20. When the tip 40 is pushed into the body of the safety key 20 internal features of the safety key 20 extend the wings 30 and 31 from the cylindrical body sides of the safety key 20 as shown in FIG. 4 to provide an obvious visual indicator that the safety key 20 is not properly inserted in the holes in the inversions bench. The wings 30 and 31 pivot from the body 21 through pivot axles 61 and 60 (not shown in this figure). Recess(es) 22 allow the wings 30 and 31 to lay flat against the sides of the safety key 20 to provide a cylindrical appearance when the key is properly positioned to notify a user that the inversion bench is safe to rotate.

The user can also pull on handle 45 to pull shaft 46 out of the body of the safety key 20. Pulling the handle 45 will also extend the wings 30 and 31 from the body of the safety key 20. If the handle 45 is released the compression spring 50 will return the wings 30 and 31 to the normal retracted position as shown in FIG. 3.

FIG. 5 shows a perspective cross-sectional view from FIG. 3 of the safety key 10 with the wings retracted, FIG. 6 shows a cross-sectional view of the safety key 10 from FIG. 3 with the wings retracted and FIG. 7 shows a cross-sectional view of the safety key 10 from FIG. 4 with the wings extended. The cylindrical body 21 of the safety key 10 has a larger diameter 21 and a stepped smaller diameter 23. The smaller stepped diameter 23 approximates the mounting surface in the inversion table.

The cylindrical body 21 has a central pin that slides within the cylindrical body 21. The central pin 40 is biased with a compression spring 50 in the cylindrical body. The shoulder 41 on the central pin 40 provides a surface for the compression spring 50 to push against on one side and the inside of the cylindrical body 23 has a shoulder to push against the opposing side of the compression spring 50. The central pin further has at least one guide pin 63 and 64 for guiding the deployable wings 30 and 31.

At least one wing 30 and or 31 is pivotally secured to the cylindrical body through pivoting axis 60 and 61 respectively. Each wing 30 and 31 has at least one arm 32 and 33 respectively that slidably are connected to the at least one guide pin 64 and 63 respectively whereby the guide pin(s) 64 and 63 moves the wing 30 and 31 into alignment with the cylindrical body 21 and the wing 30 and 31 extend from the body 21 based upon a position of the central pin. A conical bushing 52 also pushes against the arms 32 and 33 to rotate the wings 30 and 32 from the body 21 of the safety key 20. A handle 45 is connected to a shaft 46 through the body of the safety key 10 to compress spring 50 and extend the wings 30 and 31.

The safety key 20 has at least one wing 30 that opens out of the cylindrical body 21 when the central pin 40 is not engaged 12 in an inversion table 17, inversion bench or exercise equipment as shown in FIG. 7. The safety key 20 includes a receiver 17 configured to accept said smaller body diameter 23 and said two different cylindrical diameters 40 and 41 of the central pin. The receiver has a fixed tube 17 with at least one hole 13 and a movable tube with at least one hole 14 where the holes 13 and 14 can be concentric and have different diameters. When the central pin 40 is inserted into the at least two concentric holes 13 and 14 (as shown in FIG. 6) at least one wing 31 is recessed in the cylindrical body 21. The extended wing 31 is a visual indicator that the at least two different 13 and 14 in the two different surfaces are not aligned or concentric (as shown in FIG. 7) and the inversion table 17 or said inversion bench is not safe to invert or exercise equipment is not safe to operate.

Thus, specific embodiments of a safety key that identifies improper insertion have been disclosed. It should be apparent, however, to those skilled in the art that many more modifications besides those described are possible without departing from the inventive concepts herein. The inventive subject matter, therefore, is not to be restricted except in the spirit of the appended claims.

SEQUENCE LISTING

Not Applicable.

The invention claimed is:

1. A safety key that identifies improper insertion comprising:
   a cylindrical body having a first end with a handle and a large body diameter and a second end with a small body diameter that is opposite of said large body diameter that has a handle;
   said cylindrical body having a central pin wherein said central pin has at least two different cylindrical diameters that exist outside of said cylindrical body and said central pin slides within said cylindrical body;
   said central pin being biased with a spring within said cylindrical body;
   said central pin further having a separate at least one guide pin that is secured to said central pin;
   a pivot axis having at least one wing on at least one side of said pivot axis and at least one arm on another side of said pivoting axis;
   said at least one wing is pivotally secured to said large body diameter of said cylindrical body through said pivot axis, and
   said at least one arm is in contact with said at least one guide pin that moves with said central pin whereby said guide pin moves said at least one wing into alignment with said large body diameter of said cylindrical body, and said at least one wing extends from said body based upon a position of said central pin.

2. The safety key that identifies improper insertion according to claim 1 includes at least two wings.

3. The safety key that identifies improper insertion according to claim 1 wherein said spring is a compression spring.

4. The safety key that identifies improper insertion according to claim 1 further includes a separate conical bushing that is separate from said central pin and concentric with said central pin that pushes against said at least one arm.

5. The safety key that identifies improper insertion according to claim 4 wherein said at least one wing is pushed by said separate conical bushing and opens out of said cylindrical body when said central pin is not properly engaged.

6. The safety key that identifies improper insertion according to claim 1 wherein said central pin further has a shoulder that is in contact with said spring.

7. The safety key that identifies improper insertion according to claim 1 wherein said handle is connected to said central pin.

8. The safety key that identifies improper insertion according to claim 1 wherein movement of said handle pivots said at least one wing from said cylindrical body through said pivoting axis on said at least one wing.

9. The safety key that identifies improper insertion according to claim 1 wherein said at least one wing is retained against said cylindrical body with said spring.

\* \* \* \* \*